United States Patent
Limonad et al.

(10) Patent No.: US 12,326,798 B2
(45) Date of Patent: Jun. 10, 2025

(54) CAUSAL PROCESS DISCOVERY AND GENERATION OF CAUSAL PROCESS DISCREPANCY VIEWS FROM PROCESS EVENT LOGS

(71) Applicant: International Business Machines Corporation, Armonk, NY (US)

(72) Inventors: Lior Limonad, Afek (IL); Fabiana Fournier, Givat Ela (IL); Yuval David, Petah-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 18/463,745

(22) Filed: Sep. 8, 2023

(65) Prior Publication Data

US 2025/0086092 A1 Mar. 13, 2025

(51) Int. Cl.
*G06F 11/34* (2006.01)

(52) U.S. Cl.
CPC ...... *G06F 11/3476* (2013.01); *G06F 11/3419* (2013.01)

(58) Field of Classification Search
CPC .......... G06F 11/3476; G06F 11/3419
See application file for complete search history.

(56) References Cited

U.S. PATENT DOCUMENTS

| | | | | |
|---|---|---|---|---|
| 10,706,104 B1* | 7/2020 | Lee | ........... | G16H 50/20 |
| 2004/0243461 A1* | 12/2004 | Riggle | ........... | G06Q 10/10 703/2 |
| 2013/0262443 A1* | 10/2013 | Leida | ........... | G06F 16/24534 707/E17.014 |
| 2015/0120627 A1* | 4/2015 | Hunzinger | ........... | G06N 3/08 706/20 |
| 2016/0292248 A1* | 10/2016 | Garcia | ........... | G06Q 10/063 |
| 2019/0332957 A1* | 10/2019 | Malur Srinivasan | .. | G06N 5/045 |
| 2020/0279417 A1* | 9/2020 | Lee | ........... | G06T 11/206 |
| 2021/0182358 A1* | 6/2021 | Jalal | ........... | G06F 11/0709 |
| 2021/0256406 A1* | 8/2021 | Mueller | ........... | G06N 7/01 |
| 2022/0014445 A1* | 1/2022 | Engelberg | ........... | H04L 67/535 |
| 2022/0058558 A1* | 2/2022 | Andritsos | ........... | G06N 7/01 |
| 2022/0269859 A1* | 8/2022 | Topol | ........... | G06F 40/279 |
| 2023/0034910 A1* | 2/2023 | Engelberg | ........... | H04L 63/20 |
| 2023/0325628 A1* | 10/2023 | Nisimov | ........... | G06N 3/0464 706/21 |

OTHER PUBLICATIONS

Anonymous authors, "Inferring Causal Relations between Temporal Events", ICLR 2023 Conference Withdrawn Submission, Sep. 22, 2022, 15 pages.

(Continued)

*Primary Examiner* — Kamini B Patel
(74) *Attorney, Agent, or Firm* — Tihon Poltavets

(57) ABSTRACT

An example system includes a processor to receive a process discovery model generated based on a process event log using a process discovery process. The processor can generate a causal process model based on the process event log. The processor can generate a causal process discrepancy view based on a comparison of the process discovery model and the causal process model with respect to a causal execution pattern.

20 Claims, 9 Drawing Sheets

(56) References Cited

OTHER PUBLICATIONS

Bart F.A. Hompes et al., "Discovering Causal Factors Explaining Business Process Performance Variation", Discovering causal factors explaining business process performance variation. In Pohl, K & Dubois, E (Eds.) Advanced Information Systems Engineering: 29th International Conference, CAiSE 2017, Proceedings (Lecture Notes in Computer Science, vol. 10253), Jun. 12, 2017, 17 pages.
Caroline Lemieux et al., "General LTL Specification Mining", 2015 30th IEEE/ACM International Conference on Automated Software Engineering (ASE), Nov. 9-13, 2015, 12 pages. https://www.carolemieux.com/texada-ase15_final.pdf.
Debarun Bhattacharjya et al., "Cause-Effect Association between Event Pairs in Event Datasets", Proceedings of the Twenty-Ninth International Joint Conference on Artificial Intelligence, Jan. 7, 2021, 7 pages. https://www.ijcai.org/proceedings/2020/167.
Sander J.J. Leemans et al., "Causal Reasoning over Control-Flow Decisions in Process Models", Advanced Information Systems Engineering: 34th International Conference, CAiSE 2022, Leuven, Belgium, Jun. 6-10, 2022, 16 pages.
Tanmayee Narendra et al., "Counterfactual Reasoning for Process Optimization Using Structural Causal Models", Lecture Notes in Business Information Processing, vol. 360, Jul. 17, 2019, 16 pages.
Yutika Amelia Effendi et al., "Process Discovery of Business Processes Using Temporal Causal Relation", Journal of Information Systems Engineering and Business Intelligence, vol. 5, No. 2, Oct. 2019, 12 pages.
Yutika Amelia Effendi et al., "Time-based $\alpha$+ miner for modelling business processes using temporal pattern", Telkomnika Telecommunication, Computing, Electronics and Control, vol. 18, No. 1, Feb. 2020, 10 pages.
Zahra Dasht Bozorgi et al., "Process Mining Meets Causal Machine Learning: Discovering Causal Rules from Event Logs", 2020 2nd International Conference on Process Mining (ICPM), Oct. 5-8, 2020, 8 pages. https://arxiv.org/abs/2009.01561.

\* cited by examiner

400

CAUSAL PROCESS DISCOVERY AND GENERATION OF CAUSAL PROCESS DISCREPANCY VIEWS FROM PROCESS EVENT LOGS

BACKGROUND

The present techniques relate to process discovery. More specifically, the techniques relate to process event logs.

Process discovery pertains to a set of algorithms that are aimed to infer process flow structures from historically recorded log traces. The ability to derive process structures that truly reflect the operations at hand is used as a basis for deriving valuable insights about ongoing performance, for generating sound explanations with respect to process outcomes, and for deciding how and where such processes could be improved. There are various existing algorithms that have been developed for this goal. These algorithms have different levels of robustness in their ability to cope with data logs that may expose different degrees of noise and incompleteness. Most fundamentally, existing solutions rely on time relation dependencies among the various activities that are recorded to infer the process model. As such, a typical algorithm can infer an '→' (i.e., directly follows) relationship between activities A and B given a data log that includes process traces with several execution events of task type B referred to as activity B, each appearing immediately after an execution event of task type A, referred to as activity A in the log and containing (little to) no traces in which the order of events is reversed.

However, while in many situations such a relationship may also imply a true causal execution dependence between activities A and B, there may be certain situations in which such a conclusion based on the log may be wrong. True causal execution dependence refers to the execution of activity B being caused by the previous execution of activity A. A causal execution dependence, as used herein, means that the time activity B executes is determined by the time activity A executes in a given process. A causal execution dependence,

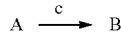

can be constructive or destructive. For example, a constructive causal execution dependence may indicate a positive causal execution dependency with a coefficient greater than zero, indicating that a time extension of activity A will result in a time extension of activity B. A destructive causal execution dependence may indicate a negative causal execution dependency in which the coefficient may be less than zero, indicating that a time extension of activity A will result in a time contraction of activity B. A causal process is a process model in which inter-activity relations among any of its activities have a causal execution dependence.

The ability to distinguish between situations in which there is indeed a true causal execution dependence or merely a time precedence relationship between any two activities in a process may be useful to understand the reasons for process execution outcomes, and how the process may sustain a variety of modifications. For example, in the above example of A→B this would be helpful in determining the following questions. For example, if activity A is eliminated, will activity B execute? If more resources were assigned to A to finish its execution earlier, would this also allow finishing the execution of B earlier? If A does not finish its execution, can the execution of activity B be initiated? And is there a possibility to execute activity B even if activity A does not eventually execute? The answer to these questions may depend on whether the execution of activity A is the cause for the execution of activity B, or vice versa, or not at all. However, existing process discovery techniques are oblivious to the underlying conditions that prohibit the distinction between true causal execution dependence and just time precedence dependence between activities. As a result, the output of process discovery may sometimes mislead the interpretation of process discovery output, or to the derivation of inadequate explanation about the reasons associated with different outcomes of the processes discovered. Thus, because the true mechanisms tying between things or events may not be known, and these methods may instead only be aware of correlation in the data, the methods may come up with a wrong conclusion about inter-relational questions.

SUMMARY

According to an embodiment described herein, a system can include processor to generate a process discovery model based on a process event log using a process discovery process. The processor can also further generate a causal process model based on the process event log. The processor can also generate a causal process discrepancy view based on a comparison of the process discovery model and the causal process model with respect to a causal execution pattern. Thus, the system enables the efficient automated generation of causal process discrepancy views. Preferably, the causal execution pattern includes a collider-based causal execution pattern. In this embodiment, collider-based causal execution pattern may be automatically analyzed. Preferably, the causal execution pattern includes a confounder-based causal execution pattern. In this embodiment, confounder-based causal execution pattern may be automatically analyzed. Preferably, the causal execution pattern includes a mediator-based causal execution pattern. In this embodiment, mediator-based causal execution pattern may be automatically analyzed. Preferably, the processor is to generate a causal annotation for the causal process discrepancy view in response to detecting that the process discovery model matches the causal execution pattern. In this embodiment, the system enables efficient annotation of causal patterns in process discovery models. Preferably, the processor is to reconstruct the process model to match a true causal execution pattern in response to detecting that the process discovery model does not match any causal execution pattern in the causal process model. In this embodiment, the system enables automatic generation of causal process discrepancy view using a comparison of the models. Optionally, the causal process model includes a process model in which inter-activity relations among any of its activities have a causal execution dependence. In this embodiment, the system enables causal execution dependences between activities to be automatically annotated. Optionally, the processor is to exclude causal relations that go against process progression from the process discovery model to generate the causal process discrepancy view. In this embodiment, the system enables the automatic removal of non-causal pairs. Optionally, the processor is to extract transposed timestamp tuples adjusted relative to a start time of the process for pairs of events from the process event log and generate the causal process model based on the extracted transposed and adjusted timestamp tuples. In this embodiment, the use of adjusted timestamp tuples enables automatic generation of the causal process discrepancy view. Optionally, the processor is to extract transposed timestamp tuples adjusted relative to a start time of a previously executed event for pairs of events from the process event log and generate the causal process model based on the extracted transposed and adjusted timestamp tuples. In this embodiment, use of adjusted timestamp tuples enables automatic generation of the causal process discrepancy view.

According to another embodiment described herein, a method can include generating, via a processor, a process discovery model based on a process event log using a process discovery process. The method can further include generating, via the processor, a causal process model based on the process event log. The method can also further include generating, via the processor, a causal process discrepancy view based on a comparison of the process discovery model and the causal process model with respect to a causal execution pattern. Thus, the method enables the efficient automated generation of causal process discrepancy views. Preferably, generating the causal process model based on the process event log includes extracting a transposed timestamp tuple for pairs of events in the event log, executing a causal discovery process over the transposed timestamp tuple to determine if either event in each of the pairs of events causes the other event, and removing all pairs in response to detecting that an opposite direction pair exists in the process discovery model. In this embodiment, non-causal pairs may be automatically removed. Optionally, the causal execution pattern includes a collider-based causal execution pattern, and the method further includes, for each sequence of three activities from the process discovery model that is detected as being a collider structure with a third activity being a collider, annotating the relation between a first activity and a second activity as not causal, annotating the relation between the second activity and the third activity as causal, and annotating the relation between the first activity and the third activity as causal and as not included as a time precedence relation in the process discovery model. In this embodiment, collider structures are automatically analyzed. Optionally, the causal execution pattern includes a confounder-based causal execution pattern, and the method further includes, for each sequence of three activities from the process discovery model that is detected as being a confounder structure with a first activity being a confounder, annotating the relation between a second activity and a third activity as not causal, annotating the relation between the first activity and the second activity as causal, and annotating the relation between the first activity and the third activity as causal and as not included as a time precedence relation in the process discovery model. In this embodiment, confounder structures are automatically analyzed. Optionally, the causal execution pattern includes a mediator-based causal execution pattern, the method further including, for each sequence of three activities from the process discovery model that is detected as being a mediator structure with a second activity being a mediator, annotating the relation between a first activity and the second activity as causal, annotating the relation between the second and a third as causal, and annotating the relation between the first activity and the third activity as causal and as not included as a time precedence relation in the process discovery model. In this embodiment, mediator structures are automatically analyzed. Preferably, generating the causal process discrepancy view includes blending results from a comparison of the process discovery model and the causal process model with respect to a collider-based causal execution pattern, a confounder-based causal execution pattern, and a mediator-based causal execution pattern into the generated causal process discrepancy view. In this embodiment, the method enables multiple execution patterns to be automatically included in the causal process discrepancy view.

According to another embodiment described herein, a computer program product for generating causal process discrepancy views can include computer-readable storage medium having program code embodied therewith. The program code executable by a processor to cause the processor to receive a process discovery model generated based on a process event log using a process discovery process. The program code can also cause the processor to generate a causal process model based on the process event log. The program code can also cause the processor to generate a causal process discrepancy view based on a comparison of the process discovery model and the causal process model with respect to a causal execution pattern. Thus, the computer program product enables the efficient automated generation of causal process discrepancy views. The program code can also cause the processor to extract a transposed timestamp tuple for pairs of events in the event log, execute a causal discovery process over the transposed timestamp tuple to determine if either event in each of the pairs of events causes the other event, and remove all pairs in response to detecting that an opposite direction pair exists in the process discovery model. In this embodiment, the computer program product enables the automatic removal of non-causal pairs.

DETAILED DESCRIPTION

Figure 1:
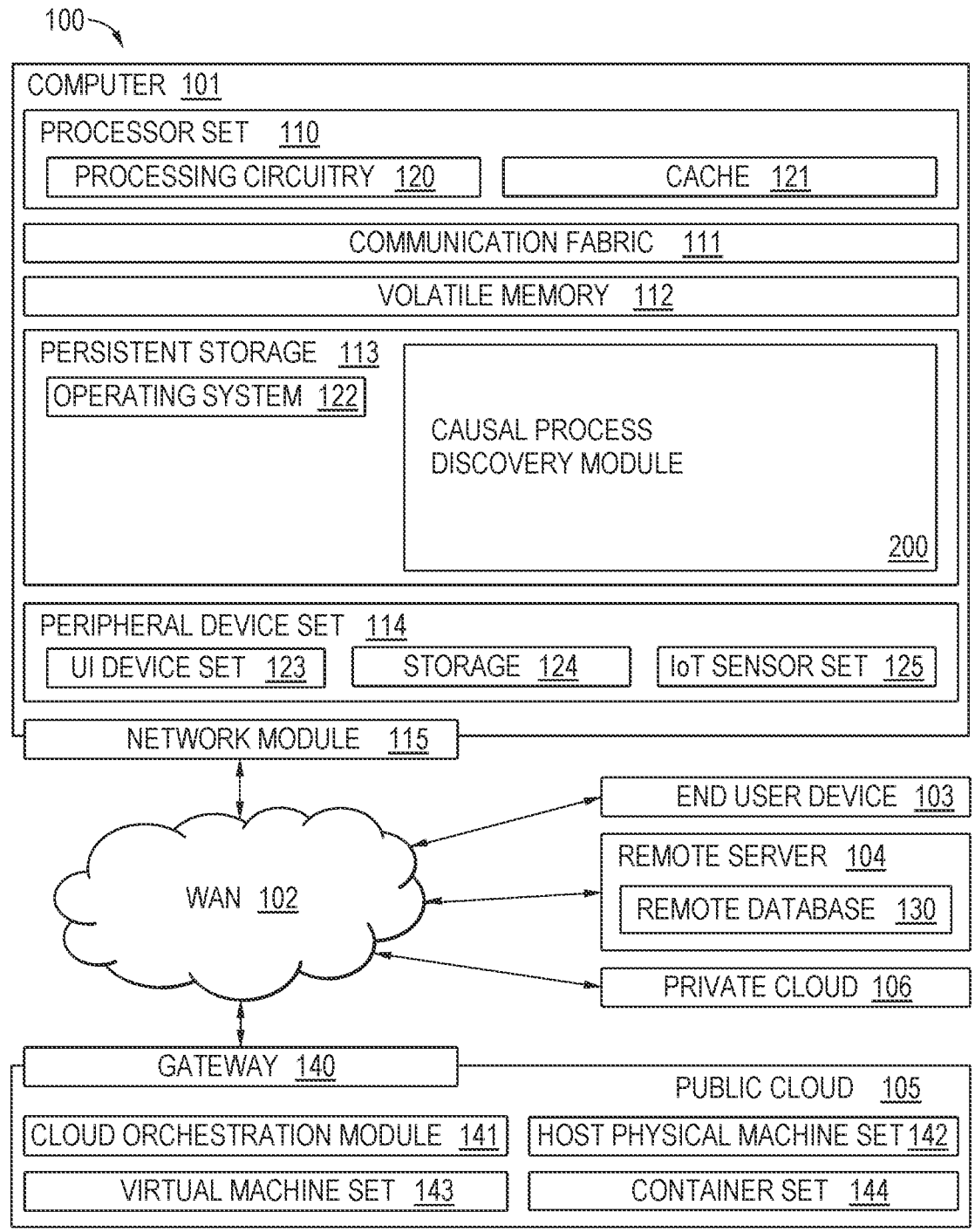
FIG. 1 is a block diagram of an example computing environment that contains an example of an environment for the execution of at least some of the computer code involved in performing the inventive methods, such as a causal process discovery module.

According to embodiments of the present disclosure, a method and apparatus can employ causal analysis of event logs to derive a new type of a process model called causal process model, and for highlighting the discrepancies between the process model generated from process mining and a generated causal process discrepancy model as a new process view. As used herein, a causal execution dependency refers to a type of dependency between any two activities such that if one activity executes, whether the execution affects the execution timing of any of its subsequent activities. For example, given an event-log (L) as an input and causal discovery (CD) and process discovery (PD) as means, an example method may include applying the PD to the event log L. An example method includes, for any two activities e1 and e2 where one directly follows the other according to PD, selecting their corresponding timestamps t1 and t2 in all traces in L that include both events e1 and e2. The method includes selecting some preceding mutual event e0 occurring at timestamp t0 relative to which the timestamps of both events are being determined. This selection of a mutual preceding timestamp is also referred to herein as anchoring of the timestamps. In various examples, the anchoring strategy could be either relative or absolute. An example for a relative anchoring is setting the anchor to match the timestamp of their mutual preceding event as t0. An example for an absolute anchoring is setting the anchor to match the timestamps of the initialization of process execution as t0. The example method includes adjusting the times t1 and t2 of events e1 and e2 to cumulative times with respect to anchor's timestamp t0: The example method includes transposing the result into a tabular structure of the form [t1', t2'], where t1'=t1−t0 and t2'=t2−t0. The example method includes applying CD over event timings t1' and t2' to determine if the execution of event e1 causes event e2. In some embodiments, the example method includes iterating this application for all event pairs in L after removing all pairs where an opposite directly follows relation exists in the PD. Thus, embodiments of the present disclosure thus use techniques for causal discovery to enable the elicitation of true causal execution dependencies between activities in a process. The embodiments allow highlighting the results of conventional processes discovery in cases where the relationships discovered do not adequately reflect the real causal execution relationships between the activities, and catering for an adequate inter-execution causal perspective from which sound insights can be drawn. For example, the insights may include explanations about the effects of various process modifications. While the intention of causal discovery methods is to facilitate causal inferencing over observational data, the embodiments described herein are unique in their employment of such techniques for the resolution of causal execution dependencies and in general as a means to enable causal process discovery. Moreover, the highlighting of the true causal execution dependencies over the conventional process model in a new causal execution view enables better process interpretations by supplementing or replacing conventional process views.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as causal process discovery module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
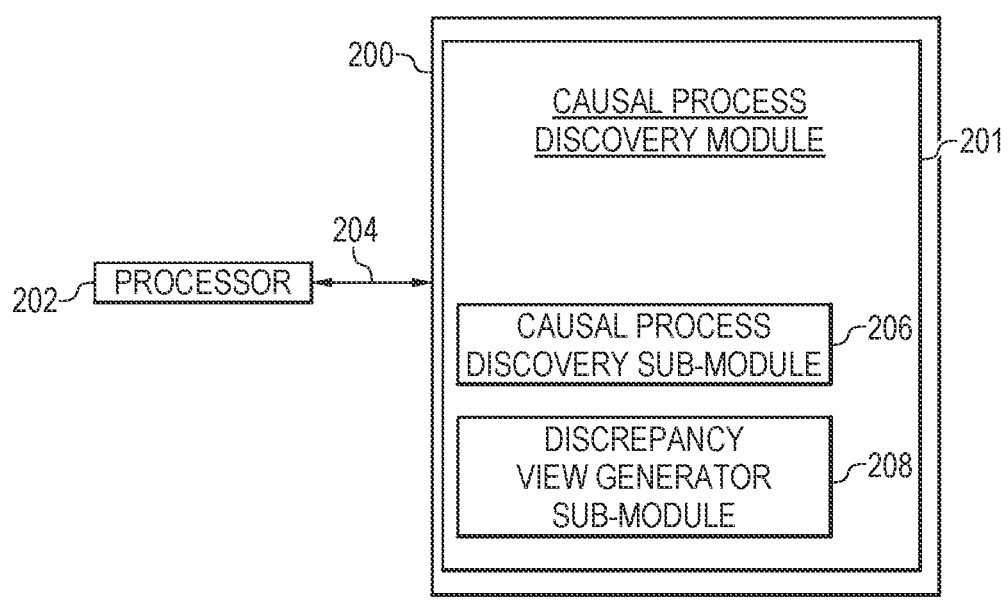
FIG. 2 is an example tangible, non-transitory computer-readable medium that can generate causal process discrepancy views.

Referring now to FIG. 2, a block diagram is depicted of an example tangible, non-transitory computer-readable medium 201 that can generate causal process discrepancy views. The tangible, non-transitory, computer-readable medium 201 may be accessed by a processor 202 over a computer interconnect 204. Furthermore, the tangible, non-transitory, computer-readable medium 201 may include code to direct the processor 202 to perform the operations of the method 300 of FIG. 3.

The various software components discussed herein may be stored on the tangible, non-transitory, computer-readable medium 201, as indicated in FIG. 2. For example, a causal process discovery sub-module 206 includes code to generate a causal process model based on the process log. For example, the causal process model may be a process model in which inter-activity relations among any of its activities have a causal execution dependence. In various examples, the causal process discovery sub-module 206 also includes code to extract a transposed timestamp tuple for pairs of activities in the log, execute a causal discovery process over the transposed timestamp tuple to determine if either activity in each of the pairs of activities causes the other activity, and remove all pairs in response to detecting that an opposite direction pair exist in the process discovery model. In some examples, the causal process discovery sub-module 206 also includes code to extract the transposed timestamp tuples adjusted relative to a start time of the process for pairs of activities from the process event log and generate the causal process model based on the extracted transposed timestamp tuples. In some examples, the causal process discovery sub-module 206 also includes code to extract transposed timestamp tuples adjusted relative to a start time of a previously executed pair of activities for pairs of activities from the process event log and generate the causal process model based on the extracted transposed timestamp tuples. A discrepancy view generator sub-module 208 includes code to generate a causal process discrepancy view based on a comparison of a process discovery model and the causal process model with respect to a causal execution pattern. In various examples, the process discovery model may have been received from an external device or service. For example, the process discovery model based may have been generated on a process event log using a process discovery process. In some examples, the process discovery model may have been generated using a heuristic miner. The discrepancy view generator sub-module 208 also includes code to compare the process discovery model and the causal process model with respect to a number of causal execution patterns. For example, the causal execution patterns may include a collider-based causal execution pattern, a confounder-based causal execution pattern, a mediator-based causal execution pattern, or any combination thereof. In some examples, the discrepancy view generator sub-module 208 also includes code to generate a causal annotation for the causal process discrepancy view in response to detecting that the process discovery model matches the causal execution pattern. For example, for each <a,b,c> sequence from the process discovery model that is detected as being a collider structure in the causal process in which c is the collider, the discrepancy view generator sub-module 208 also includes code to annotate <a,b> as not causal, annotate <b,c> as causal, and annotate <a,c> as causal and as not included as a directly-follows relation in the process discovery model. In some examples, for each <c,a,b> sequence from the process discovery model that is detected as being a confounder structure with c being a confounder, the discrepancy view generator sub-module 208 also includes code to annotate <a,b> as not causal, annotate <c,a> as causal, and annotate <c,b> as causal and as not included as a directly-follows relation in the process discovery model. In some examples, for each <a,m,b> sequence from the process discovery model that is detected as being a mediator structure with m being a mediator, the discrepancy view generator sub-module 208 also includes code to annotate <a,m> as causal, annotate <m,b> as causal, and annotate <a,b> as causal and as not included as a directly-follows relation in the process discovery model. In various examples, the discrepancy view generator sub-module 208 also includes code to reconstruct the causal process model to match a true causal execution pattern in response to detecting that the process discovery model does not match any causal execution pattern in the causal process model. In some examples, the discrepancy view generator sub-module 208 also includes code to exclude causal relations that go against process progression from the process discovery model to generate the causal process discrepancy view. In various examples, the discrepancy view generator sub-module 208 also includes code to blend results from a comparison of the process discovery model and the causal process model with respect to a collider-based causal execution pattern, a confounder-based causal execution pattern, and a mediator-based causal execution pattern into the generated causal process discrepancy view.

It is to be understood that any number of additional software components not shown in FIG. 2 may be included within the tangible, non-transitory, computer-readable medium 201, depending on the specific application. For example, the computer-readable medium 201 may include a causal pattern comparison sub-module that compares the process model with the casual process model independently of the discrepancy view generator sub-module.

Figure 3:
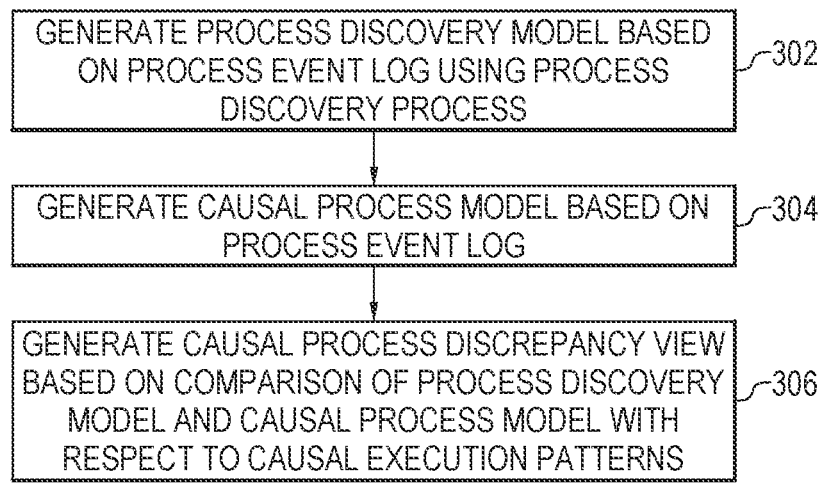
FIG. 3 is a process flow diagram of an example method that can generate causal process discrepancy views.

FIG. 3 is a process flow diagram of an example method that can generate causal process discrepancy views. The method 300 can be implemented with any suitable computing device, such as the computer 101 of FIG. 1. For example, the methods described below can be implemented by the processor set 110 of FIG. 1.

At block 302, a process discovery model generated based on a process event log using a process discovery process is received. For example, the process discovery model may be generated using an α process discovery algorithm or heuristic miner process discovery algorithm.

At block 304, a causal process model is generated based on the process event log. In various examples, the process event log may be preprocessed before the causal process model is generated. For example, process discovery may be applied as a first step to determine all possible process execution variants, where a variant refers to any possible sequence of activities from process start activity to any one of possible termination activities. As a second step, for any variant that is discovered, all possible pair of activities e1 and e2 in that variant are considered as an input for the next step of causal discovery. Another example that may be an alternative to this variant centric approach could be a general pairwise analysis of all possible activity pairs in all the traces in the event log, regardless of their partitioning into different variants. In various examples, whichever selection technique is employed, a transposed timestamp tuple can be extracted for pairs of activities e1 and e2 in the event log and selection of their corresponding timestamps t1 and t2. As a next step, an anchoring of the timestamps may be executed. For example, the transposed timestamps may be adjusted relative to some choice of some preceding mutual timestamp t0. In some examples, an absolute anchoring strategy may be used. For example, the extracted transposed timestamps may be adjusted relative to the start time of the process of the process event log. In some examples, a relative anchoring strategy may be used. For example, the extracted transposed timestamps may be adjusted with respect to a previously executed activity of the process. A causal discovery process can then be executed over the transposed and adjusted timestamp tuple [t1'=t1−t0, t2'=t2−t0] to determine if either activity e1 in each of the pairs of events causes the other activity e2. In response to detecting that an opposite direction pair exists in the process discovery model, all such pairs may be removed from the input to the causal discovery process. In some examples, the causal discovery method used may be the Linear, Non-Gaussian Acyclic Model (LINGAM) algorithm, the Peter-Clark (PC) algorithm by Peter Spirtes et al., or any other suitable causal discovery method for which the data in the log adheres to underlying assumptions of each model.

At block 306, a causal process discrepancy view is generated based on a comparison of the process discovery model and the causal process model with respect to a causal execution pattern. For example, for each <a,b,c> sequence of three activities from the process discovery model that is detected as being a collider structure with the last activity c being the collider, annotate the first two activities <a,b> as not causal, annotate the second and third activities <b,c> as causal, and annotate the first and third activities <a,c> as causal and as not included as a directly-follows relation in the process discovery model. In some examples, for each <c,a,b> sequence of activities from the process discovery model that is detected as being a confounder structure with the first activity c being a confounder, annotate the second and third activities <a,b> as not causal, annotate the first and second activities <c,a> as causal, and annotate the first and third activities <c,b> as causal and as not included as a directly-follows relation in the process discovery model. In various examples, for each <a,m,b> sequence of activities from the process discovery model that is detected as being a mediator structure with the second activity m being a mediator, annotate the first and second activities <a,m> as causal, annotate the second and third activities <m,b> as causal, and annotate the first and third activities <a,b> as causal and as not included as a directly-follows relation in the process discovery model. In various examples, results from a comparison of the process discovery model and the causal process model with respect to a collider-based causal execution pattern, a confounder-based causal execution pattern, and a mediator-based causal execution pattern may be blended into the generated causal process discrepancy view.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
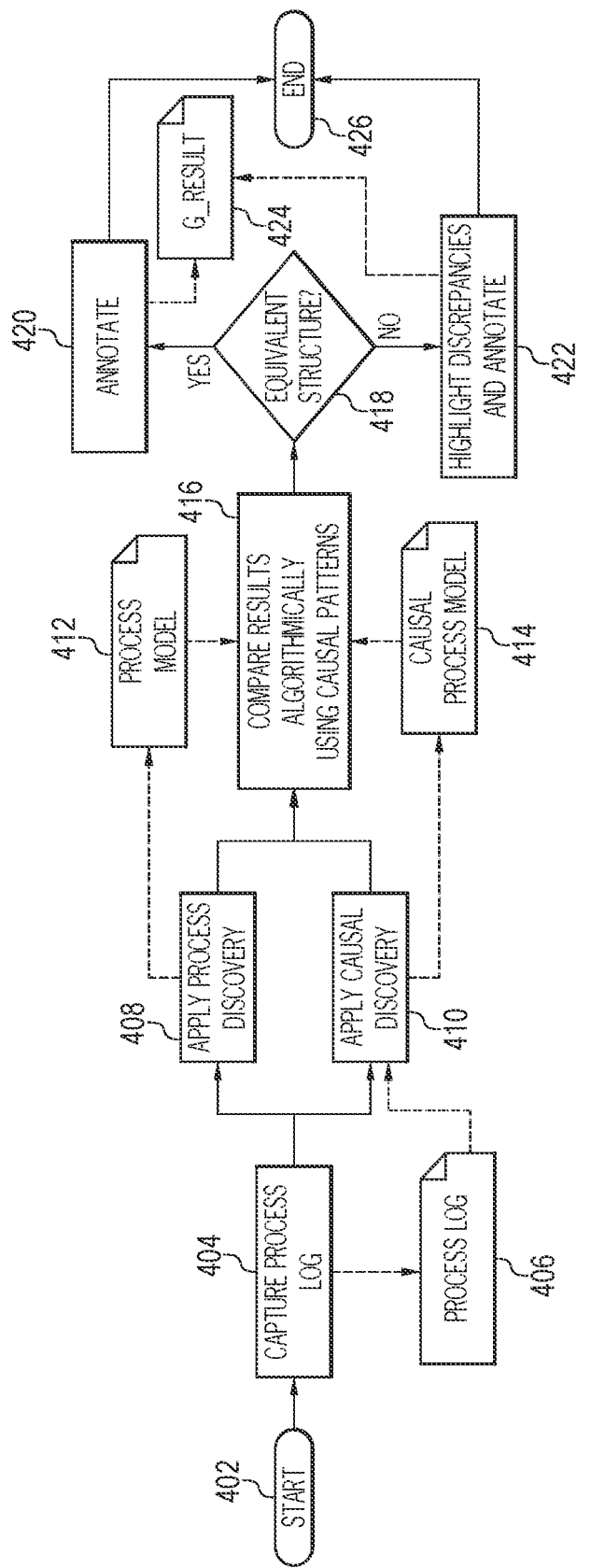
FIG. 4 is a process flow diagram of an example process for generating causal process discrepancy views.

With reference now to FIG. 4, a process flow diagram shows an example process for generating causal process discrepancy views. The example process 400 of FIG. 4 can be implemented using the processor set 110 of FIG. 1 or the processor 202 of FIG. 2.

In the example of FIG. 4, the process 400 may start at block 402. At block 404, a process log 406 is captured. For example, the process log 406 may be an event log that includes rows representing activities in a process instance. For example, the process instance may be a case. In various examples, any activity can be related to both a case and an activity and activities within a case are ordered. In various examples, the output process model that can be represented in different formats. For example, the formats may include Petri nets, a Business Process Model Notation (BPMN), or any other suitable format.

At block 408, a process discovery is applied over the process log 406 to generate a process model 412. In various examples, any suitable process discovery may be applied, such as the alpha (a) process discovery algorithm or the heuristic miner process discovery algorithm, among other suitable process discovery algorithms. For example, the alpha algorithm has no tolerance to possible order swapping in the log, while heuristic miner is more resilient to a certain frequency of activity swapping.

Still referring to FIG. 4, at block 410, a causal discovery is applied over the process event logs 406 to generate a causal process model 414. For example, the causal discovery may be applied in a pair-wise manner to the tuple of all cumulative times of any two activities A1 and A2 [in the process] to determine if either A1 causes A2 or A2 causes A1 or whether they are causally independent. In some examples, the causal discovery method used may be the LINGAM algorithm. The LiNGAM algorithm is a method for estimating structural equation models or linear Bayesian networks that is based on: using the non-Gaussianity of the distribution of the variables in the data, the inexistence of cyclic relation among these variables, and that the relationships between them can be consider as being linear.

The LiNGAM algorithm can be used to process data from the general case of a linear relationship between variables to the cause of time execution relationship between activities in a process. For example, the LiNGAM algorithm can use the regression of Y given X:Y=bX+ε or the regression of X given Y:X=$b_y$Y+$ε_y$. In some examples, the PC algorithm may be used as the causal discovery method. For example, the PC algorithm can learn skeleton graph from data. The skeleton graph may contain only undirected edges. The PC algorithm can then orient the undirected edges to form an equivalence class of directed acyclic graphs (DAGs). In various examples, given an event-log L: for any pair of activities e1 and e2 identified by activity ids i1 and i2, the causal discovery 410 can select [i1.timestamp, i2.timestamp] for all cases that include both i1 and i2. The causal discovery 410 can then also select the timestamp for the mutual preceding activity e0 identified by i0. For example, the mutual preceding activity id i0 may be a directly previous activity in the process that was executed prior to the pair of activities e1 and e2. In some examples, the mutual preceding activity e0 may be the initial timestamp of the first activity that was executed in the process. The causal discovery 410 can then adjust to cumulative times: i1.timestamp=i1.timestamp−i0.timestamp and i2.timestamp=i2.timestamp−i0.timestamp. The causal discovery 410 can then transpose the result across all log cases to a form of: T= [i1.id] [i1.timestamp] [i2.id] [i2.timestamp]. The causal discovery 410 can then apply CD algorithm X (e.g., the LiNGAM algorithm) to X (select [i1.timestamp]. [i2.timestamp] from T)=X.result. Finally, the causal discovery 410 can further, for any <i1,i2> in X.result, determine if <i2, i1>∈PD, then discard <i1,i2> if true. For any given event log L, the causal discovery 410 extract a transposed timestamp tuple T=(e1.timestamp, e2.timestamp) for any pair of activities e1,e2 in L and apply causal discovery over T to determine if <e1,e2> or <e2,e1> or neither one of the two. In various examples, the causal discovery 410 may remove all pairs where an opposite direction pair exists in PD. Thus, the causal discovery 410 may not process such pairs for causal discovery.

At block 416, results are compared algorithmically using causal patterns. For example, the results may be compared with respect to any number of causal patterns. As one example, the causal patterns may include a confounder pattern, a collider pattern, and a mediator pattern. For example, in a confounder pattern, A←B→C, the confounder B is a node that is a common cause for A and for C. In a collider pattern, A→B←C, the collider B is a node that is caused by both A and C. In a mediator pattern, A→B→C, the mediator B is a node that transmits some part of the effect of A to C. Such patterns may constitute the building blocks for any causal net structure. Example comparisons using such patterns to capture discrepancies are described with respect to FIGS. 5-7 below.

At decision diamond 418, a determination is made as to whether the process model 412 and causal process model 414 include equivalent structures based on the comparison 416. If structures are detected as equivalent, then the process may continue at 420. If the structures are not detected as equivalent, then the process may continue at block 422.

At block 420, detected equivalent structures are noted and annotated accordingly. For example, the structures may be the same between the process model and the causal process model and, therefore, the relations that already exist in the process model are annotated as being also causal.

At block 424, the annotated results from block 420 and 422 are combined into a new view, referred to in FIG. 4 as G_result. For example, the new view may be a causal process discrepancy view that includes annotated causal execution dependencies that describe causal dependencies among the executions of the activities in the process event log. The causal process discrepancy view may thus combine the results in block 416 to highlight all the discrepancies.

It is to be understood that the block diagram of FIG. 4 is not intended to indicate that the system 400 is to include all of the components shown in FIG. 4. Rather, the process 400 can include fewer or additional components not illustrated in FIG. 4 (e.g., additional process logs, models, or additional causal patterns, structures, etc.).

Figure 5:
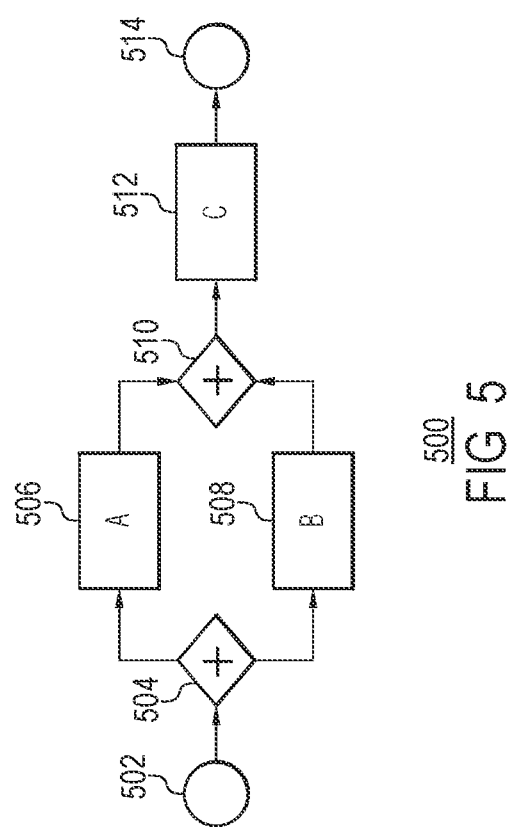
FIG. 5 is a diagram depicting an example collider structure that can be used to capture discrepancies, according to embodiments described herein.

FIG. 5 is a diagram depicting an example collider structure that can be used to capture discrepancies, according to embodiments described herein. The structure 500 includes a start node 502 coupled via a gateway node 504 to activity A 506 and activity B 508. Activities 506 and 508 are coupled via a gateway node 510 to activity C 512. Activity C 512 is connected to an end node 514.

In various examples, a process discovery model may have a detected collider structure 500 of <A,B,C>, which is a syntactic short form implying <A,B> and <B,C> in PD. For any sequence concluded by the process mining algorithm as <A,B,C> where the same sequence corresponds to a collider structure 500 as determined by a causal discovery algorithm with activity c 512 being the collider, a processor can mark the corresponding discrepancies: <A,B> not being causal, <B,C> being causal, and <A,C> being causal and not included as a directly-follows relation by the process mining algorithm. For any concluded sequence <A,B,C>*(or <B,A, C>) in the process discovery result PD, if in the result CD of causal discovery C is concluded a collider for activities A 506 and B 508, then the processor can add <A,B> in R and mark <A,B> as a 'non causal' relation, add <B,C> in R and mark <B,C> as a 'causal' relation, and add <A,C> in R and mark <A,C> as a 'causal' relation (not in PD), and finally return result R.

Figure 6:
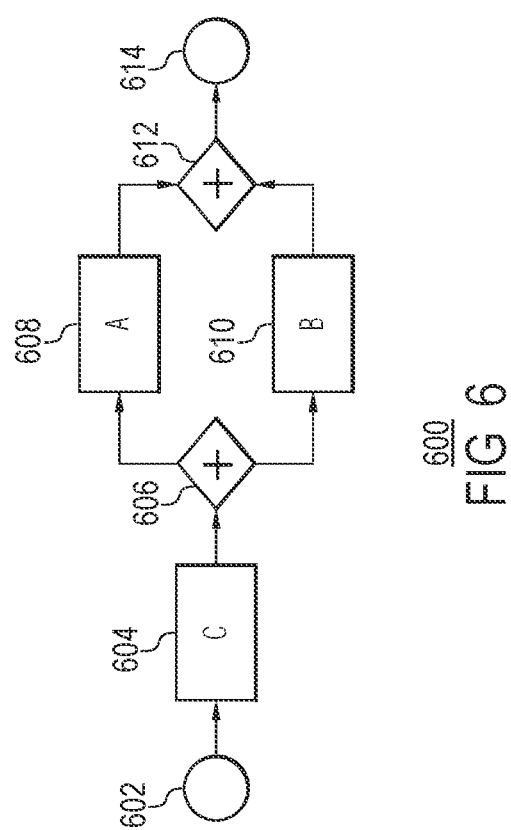
FIG. 6 is a diagram depicting an example confounder structure that can be used to capture discrepancies, according to embodiments described herein.

FIG. 6 is a diagram depicting an example confounder structure that can be used to capture discrepancies, according to embodiments described herein. The structure 600 includes a start node 602 coupled to an activity C 604. The activity C 604 is coupled via a gateway node 606 to activity A 608 and activity B 610. Activities 608 and 610 are coupled via a gateway node 612 to an end node 614.

In various examples, for any sequence concluded by a process mining algorithm as <C,A,B> where the same sequence corresponds to a confounder structure 600 as determined by a causal discovery algorithm with activity c 604 being the confounder, a processor can mark the corresponding discrepancies: <A,B> not being causal, <C,A> being causal, and <C,B> being causal and not included as a directly follows relation by the process mining algorithm. As one example, for any concluded sequence <C,A,B> (or <C,B,A>) in a PD result, if in the result CD of a causal discovery C a confounder 604 is concluded for activities A 608 and B 610, then a processor can add <A,B> in R and mark <A,B> as a 'non causal' relation, add <C,A> in R and mark <C,A> as a 'causal' relation, add <C,B> in R and mark <C,B> as a 'causal' relation (not in PD), and return updated result R.

Figure 7:
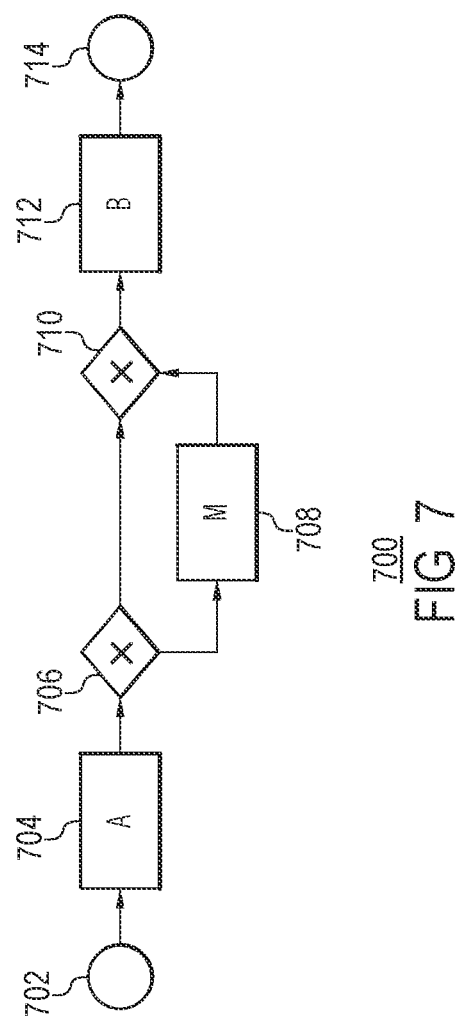
FIG. 7 is a diagram depicting an example mediator structure that can be used to capture discrepancies, according to embodiments described herein.

FIG. 7 is a diagram depicting an example mediator structure that can be used to capture discrepancies, according to embodiments described herein. The structure 700 includes a start node 702 coupled to an activity A 704. The activity A 704 is coupled via a gateway node 706 to activity M 708 and a gateway node 710. The structure 700 also includes activity B 712 coupled to gateway node 710 and end node 714.

In various examples, for any sequence concluded by a process mining algorithm as <A,M,B> where the same sequence corresponds to a mediator structure 700 as determined by a causal discovery algorithm with activity m 708 being the mediator, a processor can mark the corresponding discrepancies: <A,M> being causal, <M,B> being causal, and <A,B> being causal and not included as a directly follows relation by the process mining algorithm. As one example, for any concluded sequence <A,M,B> in a process discovery result PD, if in the result CD of a causal discovery, activity M 708 is concluded as a mediator for activities A 704 and B 712, then a processor can add <M,B> in R and mark <M,B> as a 'causal' relation, add <A,M> in R and mark <A,M> as a 'causal' relation, add <A,B> in R and mark <A,B> as a 'causal' relation (not in PD), and return updated result R. In various examples, the mediator pattern is defined as having occurrence dependence of activity 'A' and of activity 'B' as being partially dependent on the occurrence of activity 'M', with also a possible direct dependence between the occurrences of the latter two activities. In other words, the occurrence of M is partially blocking the effect of A on B in the process. The process discovery analysis of a process log that is generated by such an execution pattern is likely to improperly conclude the existence of only indirect execution dependence between activities 'A' and 'B' leading to the following incorrect sequential pattern as its output: A→M→B. Thus, the techniques described herein may be used to fix this issue.

Figure 8:
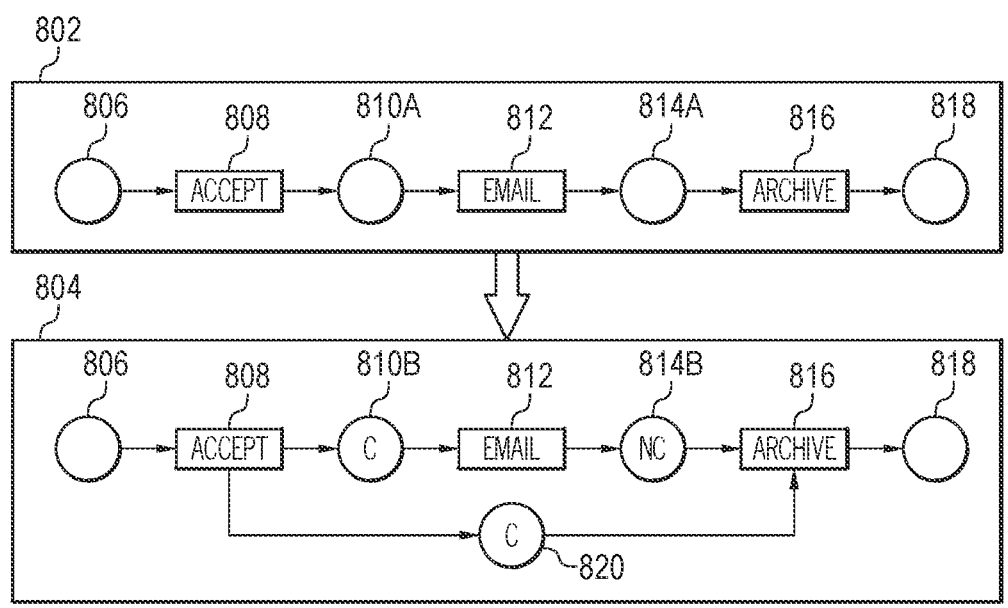
FIG. 8 is a process flow diagram depicting an example reconstruction in which a process model includes a sequential pattern and the causal process model includes a true causal execution pattern that corresponds to a confounder structure.

FIG. 8 is a process flow diagram depicting an example process of reconstruction in which a process model includes a sequential pattern and the causal process model includes a true causal execution pattern that corresponds to a confounder structure. The process 800 of FIG. 8 includes the generation of a process model at block 802. For example, the process model 802 may be generated using any suitable process mining algorithm, such as an α process discovery algorithm or heuristic miner process discovery algorithm. The process model 802 includes a start place node 806 coupled to a first transition node 808 that designated an activity named "ACCEPT." Also in the remaining parts of FIG. 8, the Petri-net notation is used where transition nodes represent process activities and places denote the transitions between the activities. The first activity 808 is coupled via a place node 810A to activities 812 named "EMAIL." The activity 812 is further coupled via a place node 814A to activity 816 named "ARCHIVE." Activity 816 is coupled to an end place node 818. The process flow 800 further includes the generation of an updated causal process discrepancy view 804 containing similarly referenced elements. In addition, the updated view 804 includes causally labeled place nodes 810B and non-causally labeled place node 814B, as well as additional causally labeled place node 820. Causally labeled places have been labeled with a "C" symbol and non causally labeled places have been labeled with a "NC" symbol. The structure of the updated process model 804 has activity 808 further coupled via causally labeled place 820 to activity 816.

In the example reconstruction 800 of FIG. 8, the process mining (PM) algorithm used may be an α process discovery algorithm or heuristic miner process discovery algorithm. The causal discovery algorithm used may be the LiNGAM algorithm. In various examples, the PM algorithm may yield a sequential pattern as in 802 while the causal discovery algorithm discovered a true causal execution pattern that corresponds to the confounder case as in 804. In this case, as one example, the following algorithm may be used by the processor to reconstruct the output of the PM algorithm to match the true causal execution pattern detected by the causal discovery algorithm:

Algorithm 1

Given a sequential structure discovered by any process discovery (PD) algorithm:

---

Require:
$G_{PD}, G_L$
$\forall t \in G_{PD} \Rightarrow \exists t' \in G_L$
$G_{result} \leftarrow G_{PD}$
1: for each $(a,b,c) \in G_{PD} : a \rightarrow b, b \rightarrow c, a \not\rightarrow c$ do
2:     if $\exists (a', b', c') \in G_L : a' \xrightarrow{c} b', a' \xrightarrow{c} c'$ then

```
3:          if a →b then
4:              G_result ← G_PD.LABEL(a→b, 'C')
5:          else
6:              G_result ← G_PD.ADD(a →c→ b)
7:          end if
8:          G_result ← G_PD.ADD(a →c→ c)
9:          if b' ↛ c' then
10:             G_result ← G_PD.LABEL(b→c, 'not C')
11:         end if
12:     end if
13: end for
14: return G_result
``` where $G_{PD}$, $G_L$, are given PD and LiNGAM output graphs, t and t' denote the same activity in the respective models, and $G_{result}$ is the causal discrepancy view that highlights the $\Delta(G_{PD}-G_L)$. In particular, for each (a,b,c) in $G_{PD}$, the processor executing algorithm 1 may check if a' is a confounder in $G_L$. If so, then given that b directly-follows a, the processor may label a→b, 'C'. Given that b eventually-follows a, then the processor may add $$a \xrightarrow{c} b$$

only if it was not already included in $G_{result}$. The processor may then add $$a \xrightarrow{c} c$$

to $G_{result}$. Finally, the processor executing algorithm 1 may check if b' doesn't cause c', and if so, then label b→c, 'not C'.

Figure 9:
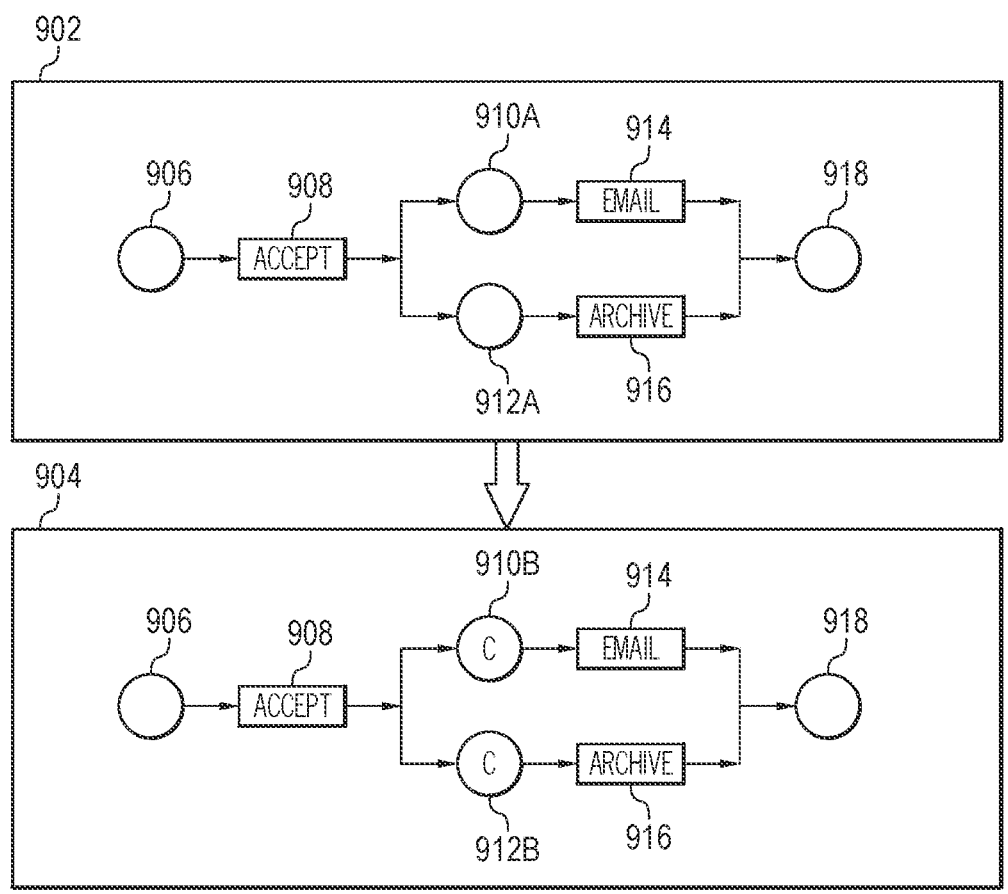
FIG. 9 is a process flow diagram depicting an example annotation in which a process model includes a pattern that matches a causal process model that corresponds to a confounder structure.

FIG. 9 is a process flow diagram depicting an example annotation in which a process model includes a pattern that matches a causal process model that corresponds to a confounder structure. The process flow 900 of FIG. 9 includes the generation of a process model at block 902. For example, the process model 902 may be generated using any suitable process mining algorithm, such as the α process discovery algorithm and heuristic miner process discovery algorithm. The process model 902 includes a start place node 906 coupled to a first transition node 908 that designates an activity named "accept." Also in the remaining parts of the figure, the Petri-net notation is used where transition nodes represent process activities and places denote the transitions between the activities. The first activity 908 is coupled via place nodes 910A and 912A to activities 914 and 916, named "EMAIL" and "ARCHIVE", respectively. Activities 914 and 916 are coupled to an end place node 918. The process flow 900 further includes the generation of an updated causal process discrepancy view 904 containing similarly referenced elements. In addition, the updated view 904 includes causally labeled place nodes 910B and 912B, which have both been labeled as causal with a "C" symbol.

In FIG. 9, the PM algorithm yielded a process model 902 with a pattern that matches a confounder causal execution pattern. In such examples, a processor may only annotate its relations with the symbol 'C' to make its presence explicit in the updated PM output. As shown in FIG. 9, the resulting labeled causal nodes 910B and 912B accordingly include a "C" indicating a causal relationship between activities 908 and 914, and activities 908 and 916, respectively. As one example, the following algorithm may have been used by the processor to annotate the output of the PM algorithm to make these causal connections explicit:

Algorithm 2

Given a causal structure discovered by any process discovery (PD) algorithm:

```
Require:
        G_PD, G_L
        ∀t ∈ G_PD ⇒ ∃t' ∈ G_L
        G_result ← G_PD
1: for each (a,b,c) ∈ G_PD : a→b, a→c, b↛c, c↛b do
2:      if ∃ (a', b', c') ∈ G_L : a' →c→ b', a' →c→ c' then
3:          G_result ← G_PD.LABEL(a→b, 'C')
4:          G_result ← G_PD.LABEL(a→c, 'C')
5:      end if
6: end for
7: return G_result
``` where $G_{PD}$, $G_L$, are given PD and LiNGAM output graphs, t and t' denote the same activity in the respective models, and $G_{result}$ is the causal discrepancy view that highlights the $\Delta(G_{PD}-G_L)$. As in Algorithm 1, the process may check whether a' is a confounder activity in $G_L$. If so, then the processor may explicitly label both a→b and a→c as casual.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive a process discovery model generated based on a process event log using a process discovery process;
   extract transposed timestamp tuples adjusted relative to a start time of the process discovery model for pairs of activities from data present in the process event log;
   generate a causal process model based on the process event log and the transposed timestamp tuples that corresponds to a confounder structure, wherein the confounder structure includes the data present in the process event log; and
   generate a causal process discrepancy view based on a comparison of the process discovery model and the causal process model with respect to a causal execution pattern, wherein the causal process discrepancy view, highlights discrepancies among executions of the pairs of activities from the process event log.

2. The system of claim 1, wherein the causal execution pattern comprises a collider-based causal execution pattern.

3. The system of claim 1, wherein the causal execution pattern comprises a confounder-based causal execution pattern.

4. The system of claim 1, wherein the causal execution pattern comprises a mediator-based causal execution pattern.

5. The system of claim 1, wherein the processor is to generate a causal annotation for the causal process discrepancy view in response to detecting that the process discovery model matches the causal execution pattern.

6. The system of claim 1, wherein the processor is to reconstruct the process discovery model to match a true causal execution pattern in response to detecting that the process discovery model does not match any causal execution pattern in the causal process model.

7. The system of claim 1, wherein the causal process model comprises a process model in which inter-activity relations among any of its activities have a causal execution dependence.

8. The system of claim 1, wherein the processor is to exclude causal relations that go against process progression from the process discovery model to generate the causal process discrepancy view.

9. A computer-implemented method, comprising:
receiving, via a processor, a process discovery model generated based on a process event log using a process discovery process;
extracting transposed timestamp tuples adjusted relative to a start time of the process discovery model for pairs of activities from data present in the process event log;
generating, via the processor, a causal process model based on the process event log and the transposed timestamp tuples that corresponds to a confounder structure, wherein the confounder structure includes the data present in the process event log; and
generating, via the processor, a causal process discrepancy view based on a comparison of the process discovery model and the causal process model with respect to a causal execution pattern, wherein the causal process discrepancy view, highlights discrepancies among executions of the pairs of activities from the process event log.

10. The computer-implemented method of claim 9, wherein generating the causal process model based on the process event log comprises:
executing a causal discovery process over the transposed timestamp tuples to determine if either activity in each of the pairs of activities causes another activity; and
removing all pairs in response to detecting that an opposite direction pair exists in the process discovery model.

11. The computer-implemented method of claim 9, wherein the causal execution pattern comprises a collider-based causal execution pattern, further comprising, for each sequence of three activities from the process discovery model that is detected as being a collider structure with a third activity being a collider, annotating a first relation between a first activity and a second activity as not causal, annotating a second relation between the second activity and the third activity as causal, and annotating a third relation between the first activity and the third activity as causal and as not included as a time precedence relation in the process discovery model.

12. The computer-implemented method of claim 9, wherein the causal execution pattern comprises a confounder-based causal execution pattern, further comprising, for each sequence of three activities from the process discovery model that is detected as being a confounder structure with a first activity being a confounder, annotating a first relation between a second activity and a third activity as not causal, annotating a second relation between the first activity and the second activity as causal, and annotating a third relation between the first activity and the third activity as causal and as not included as a time precedence relation in the process discovery model.

13. The computer-implemented method of claim 9, wherein the causal execution pattern comprises a mediator-based causal execution pattern, further comprising, for each sequence of three activities from the process discovery model that is detected as being a mediator structure with a second activity being a mediator, annotating a first relation between a first activity and the second activity as causal, annotating a second relation between the second activity and a third activity as causal, and annotating a third relation between the first activity and the third activity as causal and as not included as a time precedence relation in the process discovery model.

14. The computer-implemented method of claim 9, wherein generating the causal process discrepancy view comprises blending results from a comparison of the process discovery model and the causal process model with respect to a collider-based causal execution pattern, a confounder-based causal execution pattern, and a mediator-based causal execution pattern into the causal process discrepancy view.

15. A computer program product for generating causal process discrepancy views, the computer program product comprising a computer-readable storage medium having program code embodied therewith, the program code executable by a processor to cause the processor to:
receive a process discovery model generated based on a process event log using a process discovery process;
extract transposed timestamp tuples adjusted relative to a start time of the process discovery model for pairs of activities from data present in the process event log;
generate a causal process model based on the process event log and the transposed timestamp tuples that corresponds to a confounder structure, wherein the confounder structure includes the data present in the process event log; and
generate a causal process discrepancy view based on a comparison of the process discovery model and the causal process model with respect to a causal execution pattern, wherein the causal process discrepancy view, highlights discrepancies among executions of the pairs of activities from the process event log.

16. The computer program product of claim 15, further comprising program code executable by the processor to:
execute a causal discovery process over the transposed timestamp tuples to determine if either activity in each of the pairs of activities causes another activity; and
remove all pairs in response to detecting that an opposite direction pair exists in the process discovery model.

17. The computer program product of claim 15, wherein the causal execution pattern comprises a collider-based causal execution pattern, further comprising program code executable by the processor to:
annotate, for each sequence of three activities from the process discovery model that is detected as being a collider structure with a third activity being a collider, a first relation between a first activity and a second activity as not causal;
annotate a second relation between the second activity and the third activity as causal; and
annotate a third relation between the first activity and the third activity as causal and as not included as a time precedence relation in the process discovery model.

18. The computer program product of claim 15, wherein the causal execution pattern comprises a confounder-based causal execution pattern, further comprising program code executable by the processor to:
annotate, for each sequence of three activities from the process discovery model that is detected as being a confounder structure with a first activity being a confounder, a first relation between a second activity and a third activity as not causal;
annotate a second relation between the first activity and the second activity as causal; and
annotate a third relation between the first activity and the third activity as causal and as not included as a time precedence relation in the process discovery model.

19. The computer program product of claim 15, wherein the causal execution pattern comprises a mediator-based causal execution pattern, further comprising program code executable by the processor to:
annotate, for each sequence of three activities from the process discovery model that is detected as being a mediator structure with a second activity being a mediator, a first relation between a first activity and the second activity as causal;
annotate a second relation between the second activity and a third activity as causal; and
annotate a third relation between the first activity and the third activity as causal and as not included as a time precedence relation in the process discovery model.

20. The computer program product of claim 15, wherein program code executable by the processor to generate the causal process discrepancy view further comprises program code executable by the processor to:
blend results from a comparison of the process discovery model and the causal process model with respect to a collider-based causal execution pattern, a confounder-based causal execution pattern, and a mediator-based causal execution pattern into the causal process discrepancy view.

* * * * *